Aug. 22, 1961   A. E. R. ARNOT   2,997,194
FORK LIFT TRUCK

Filed May 7, 1958   2 Sheets-Sheet 1

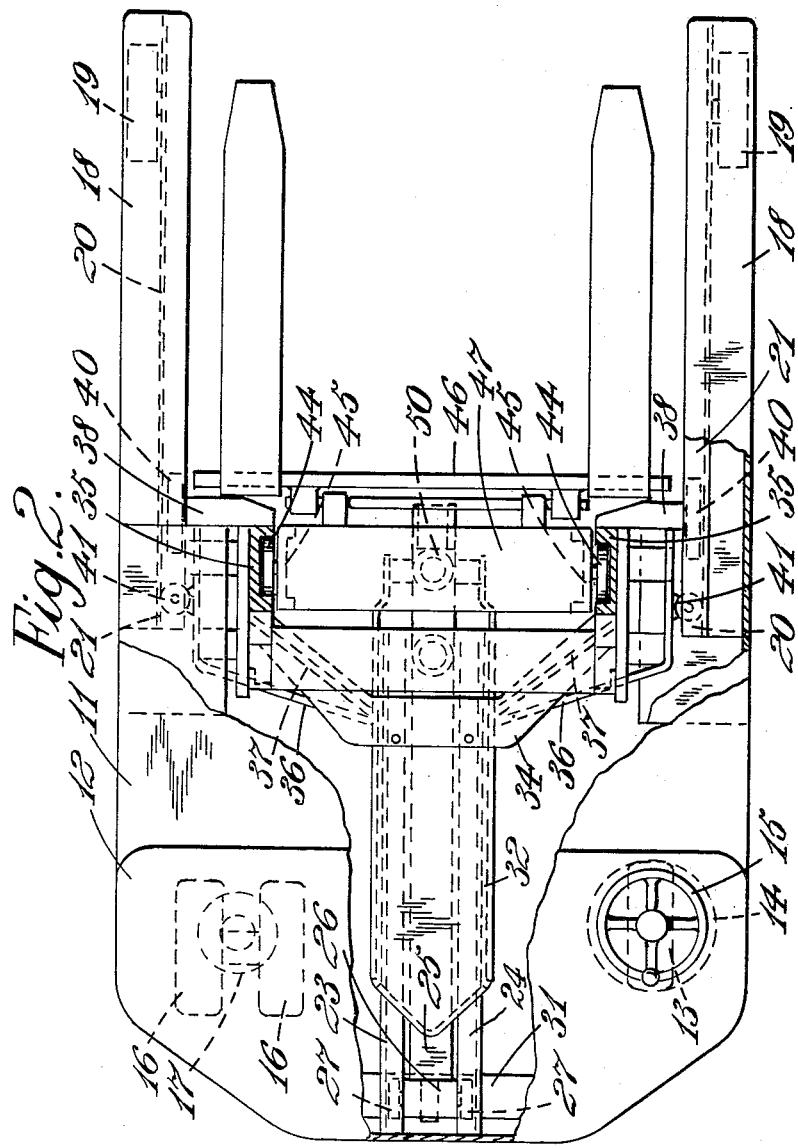

United States Patent Office 2,997,194
Patented Aug. 22, 1961

2,997,194
FORK LIFT TRUCK
Alfred Erwin Reginald Arnot, Basingstoke, England, assignor to Lansing Bagnall Limited, Basingstoke, Hampshire, England, a British company
Filed May 7, 1958, Ser. No. 733,546
Claims priority, application Great Britain May 17, 1957
8 Claims. (Cl. 214—670)

This invention comprises improvements in or relating to fork and like trucks.

Fork trucks are known which have in front of the driving part of the truck forwardly projecting limbs which extend parallel with and close to the ground and carry supporting wheels at their front ends and are formed as guides for a travelling load-carrying structure, such as, for example, a mast, which can be advanced or retracted along them by mechanical or hydraulic means. The side limbs are usually known as straddle legs, and they ensure that even when the mast is reached out to its foremost position, the weight is well supported on both sides at a point near enough to the front of the forks carried on the mast to prevent the truck being tipped over forwards by the load. A truck of this kind is hereinafter referred to as a reach-truck of the type described.

In such trucks as heretofore constructed, it has been usual for the load-carrying structure to be caused to traverse the straddle legs by chains, one in each leg, to which the mast is connected and which are driven by appropriate means in the rear portion of the truck. The load-supporting structure has normally been guided and kept upright by guide-engaging members operating in the guides of the straddle legs. Such guide engaging members are necessarily spaced not very far apart in a fore-and-aft direction and so the support is not well adapted to resist very pronounced tipping stresses. Moreover, twisting stresses which tend to occur on uneven floors may take the straddle legs out of parallelism and cause jamming.

According to the present invention, in a reach-truck of the type described the rear part of the body of the truck is provided with central longitudinal guide means, the straddle legs are provided with co-operative guide means and a travelling load-supporting structure is provided, having forward runners to operate along the guide means on the straddle legs and rear runners to operate along the central guide means. Such a mounting for the load-supporting structure is in effect a three-point support and is both firmer and less likely to jam than is the case with earlier constructions.

Advance and retraction of the mast can be effected on such a truck by a single centrally-located hydraulic jack, or a plurality of jacks close together or in line on, or close to, the centre line of the travelling structure, if desired. This construction provides a singularly firm base for the travelling structure and an easy means of moving it when desired.

The following is a description by way of example of one construction in accordance with the invention:

In the accompanying drawings,

FIGURE 2 is a plan of the same, also partly broken away.

Figures 1, 3:
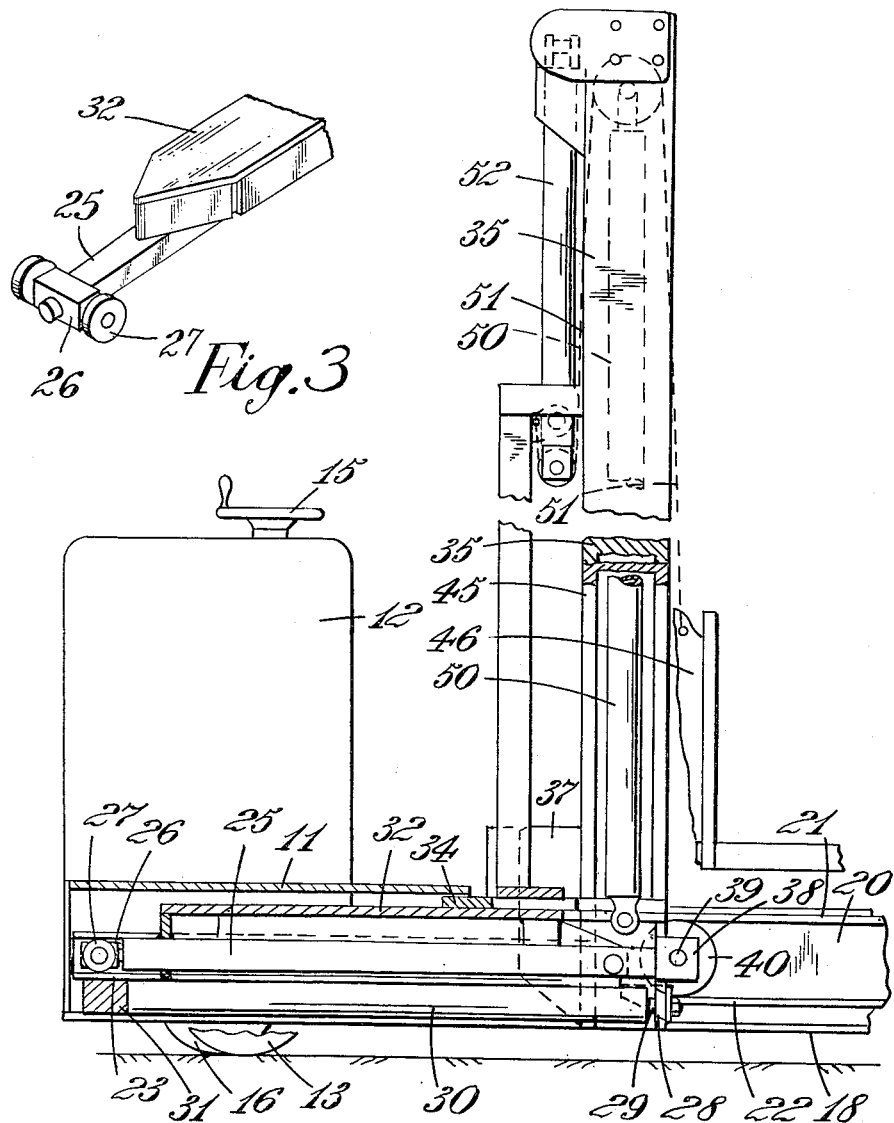
FIGURE 1 is a side elevation of a truck, with parts broken away and sectioned to show the internal construction.
FIGURE 3 is a perspective view of a detail of the truck.

A truck is provided having a rear body portion 11 which extends transversely across the whole width of the truck close to the ground and has an upstanding box-like portion 12 at the back. In the box-like portion there is mounted a driving and steering gear (comprising a main driving wheel 13 mounted upon a steering turntable 14 and driven by an electric motor (not shown) carried by the turntable and a steering wheel 15), and a pair of caster wheels 16 supported on a caster-wheel mounting 17. The driving wheel and the caster wheels are located one to one side and the other to the other side of the chassis and connected by a suspension (not shown) which ensures that the wheels can tip relatively to the body of the truck to accommodate irregularities of the floor and also that they give effective support to the body on both sides. These parts are all well known in themselves.

The body 11 of the truck in front of the box-like portion has a space to support a storage battery and on each side of the storage battery, is united to forwardly projecting straddle legs 18 which carry ground wheels 19 at their front ends. The straddle legs are constructed as box members with channel members 20 on their inner faces having their flanges 21, 22 projecting inwardly towards one another.

On the underside of the rear part of the body of the truck, between the driving and caster wheels 13 and 17, there are supported two other channel members 23, 24 with their flanges facing one another, but much closer together than the channel members 20 in the straddle legs 18.

Between the channel members 23, 24 on the underside of the rear part of the chassis, there extends a horizontal mast supporting shaft 25, forming part of a travelling supporting carriage for a mast 35. This shaft is pivoted at its rear end to a cross axle 26 which constitutes a rocker and carries guide rollers 27 which run in the channel members 23, 24. The rear shaft 25 of the mast supporting carriage is long enough when in its rearmost position to extend over almost the whole length of the space between the channel members 23, 24 on the underside of the truck body, and at its front end it carries a downwardly projecting eye 28 to which is bolted the front end of the ram 29 of a hydraulic jack 30. The cylinder of the jack 30 surrounding the ram extends beneath the rear shaft 25 of the mast supporting carriage, and at its rear end, the cylinder is bolted to a cross member 31 on the underside of the body. The jack is double acting and is therefore capable of moving the rear shaft of the mast supporting carriage forward and back as desired and its stroke is sufficient to cover the whole traversing movement required from the mast 35.

The rear shaft 25 of the mast supporting carriage is strengthened by a box-member 32 which overlies it and supports a horizontal plate 34 near its front end which extends across the truck from side to side above the level of the guide channels 23, 24 between which the rear shaft 25 works. The connection of this plate to the box-like part 32 of the horizontal rear shaft is strengthened by two plate-like struts 36, on each side which extend from the rear part of the shaft forwardly towards the side edges of the plate so that, as viewed in plan, the general shape of the mast supporting carriage is that of a T with a triangular head having its smallest end at the rear and the base of the triangle at the front end broad enough to nearly fill the space between the guide channels 20 on the straddle legs 18. At this front end of the carriage there are outwardly projecting brackets 38 which carry stub axles 39 for guide rollers 40 running in the channels 20 on the straddle legs. There are two guide rollers at each side, one the roller 40 mounted on a horizontal axis and fitting between the channel members in an up and down direction, and the other a roller 41 mounted on a vertical axis and serving to bear on the back of the channel. Provision is made in the mounting of the rollers 40 and 41 so that they can be laterally adjusted. Thus, the front end of the mast supporting carriage is guided both laterally and vertically, and the whole carriage forms an extremely rigid support for the mast 35.

The travelling mast 35 is supported on the mast supporting carriage-member 32 and plate 34 and consists of two vertical channel members with their flanges turned inwardly towards one another, one being located near each side of the front portion of the mast supporting carriage. The attachment of these mast sections are stiffened by plate webs 37 which connect them to the base-plate 34 of the carriage, and the base-plate 34 of the carriage is cut away between the mast channels to allow a clear space between the mast channels to extend down to floor level. Within the channel members of the fixed mast 35 there are two similar channel members 45 of a rising mast and these are guided on the fixed mast 35 by rollers 44 which run between the flanges thereof. The channel members of the rising mast in like manner support rollers (not drawn in) which guide a rising and falling fork-carriage 46. The channel-shaped sides of each part of the mast are connected by cross-members at the top, of which only the cross-member 47 of the rising mast 45 appears in FIGURE 2. On the box-like part 32 of the mast supporting carriage in the centre between the sides of the masts is a vertical lifting jack 50 which is connected to the rising mast and by a chain 51 to the fork carriage and behind the mast 35 and secured to the top of it is an inverted jack 52 operating in the same chain. These enable the chain to raise and lower the mast and carriage in accordance with U.S. Patent No. 2,883,003.

The effect of this construction is that the whole mast structure 35 with its fork carriage 46 and jacks 50, 52, while very firmly supported, can be advanced and retracted by the operation of the single horizontal double-acting jack 30 which is located between the guide channels in the lower portion of the truck body. There is no intermediate mechanism between this jack and the mast supporting carriage, and therefore the design is simple and rigid.

The widely spaced rollers 40 and 27 give three-point support to the mast and the rocker 26 at the rear of the mast supporting carriage allows for any lack of parallelism between the various channels, which may arise through warping or twisting due to standing on irregular floors.

While the load supporting structure in the construction described comprises a mast with a travelling carriage upon it, it is to be understood that the invention is not limited to a masted truck. Any other load supporting structure might be mounted on the travelling support, such as one for low-lift pallet forks or stillages or a carrier for coils of cable or a clamp for bales or other devices for holding goods.

I claim:

1. In an industrial load-carrying truck, the combination of a chassis having a rear main part and straddle legs which extend forwardly from the main part close to the ground and are spaced apart, supporting wheels on fixed axles at the forward ends of the straddle legs, a driving and steering wheel structure at the rear part of the chassis, two lateral parallel guides one on each straddle leg, a third central guide on said rear part disposed parallel to and rearwardly of said lateral guides, a traveling load-supporting structure supported at three points by two lateral shafts having forward runners which operate along the two lateral guides and a rearwardly extending shaft operatively connected to a rearward runner which operates along the central guide, and means to advance and retract the load-supporting structure along the guides.

2. A truck as claimed in claim 1 wherein the lateral guides on the straddle legs comprise inwardly-facing channel members mounted on the straddle legs and the runners comprise rollers running inside the channel members.

3. A truck as claimed in claim 1 wherein the third central guide on the rear part of the chassis comprises two channel members close together side by side and the rearward runner comprises a rocker operatively connected to the rearwardly extending shaft and two rollers on the rocker which run inside the channel members constituting the third guide.

4. A truck as claimed in claim 1 wherein the load-supporting structure has mounted upon it a mast having a rising carriage, means for moving the rising carriage up and down the mast and means on the rising carriage to support a load between the straddle legs.

5. A truck as claimed in claim 1 wherein a piston-and-cylinder device is provided close to and parallel with the third guide, one end of which is engaged with the chassis and the other end with the load-supporting structure to move the latter along the guides.

6. In an industrial load-carrying truck the combination of a chassis having a rear main part and parallel straddle legs which extend forwardly from the main part close to the ground, supporting wheels on the straddle legs, a wheeled support beneath the main part of the chassis a guide along the inner side of each straddle leg, a third central guide below the main part of the chassis, a reach-carriage comprising a cross-member extending across the space between the straddle legs and having means to engage and run along the guides thereon, said cross-member having rigidly secured to it a rearwardly extending shaft, means on the shaft to engage and run along the third central guide, piston-and-cylinder means close to and parallel with the third guide to advance and retract the carriage and load-lifting means on the carriage.

7. A truck as claimed in claim 6, wherein a mast is secured on the reach carriage, and the load-lifting means comprise a rising carriage on the mast, load-supporting means on the rising carriage and means to move the rising carriage up and down the mast, the mast being rigidly fixed to the cross-member and to the rearwardly extending shaft of the reach carriage.

8. In an industrial load-carrying truck the combination of a chassis having a rear main part and two spaced straddle legs which extend forwardly therefrom close to the ground, supporting wheels for the straddle legs and the main part, two lateral guides on the straddle legs, a third central guide on the main part disposed parallel and rearwardly of the straddle legs, a traveling load-supporting structure supported at three points by two lateral shafts having forward runners to engage the lateral guides and a rearwardly extending shaft pivoted to a rocker having rearward runners which engage the central guide, and means to advance or retract the load-supporting structure along the guides.

References Cited in the file of this patent

UNITED STATES PATENTS

| | | |
|---|---|---|
| 2,320,601 | Howell | June 1, 1943 |
| 2,405,893 | Leftwich | Aug. 13, 1946 |
| 2,667,985 | Woughter | Feb. 2, 1954 |
| 2,828,879 | Arnot | Apr. 1, 1958 |

FOREIGN PATENTS

| | | |
|---|---|---|
| 1,093,804 | France | May 10, 1955 |